Jan. 4, 1927. 1,613,474
R. MOORE
BRAKE ENGINE
Filed Nov. 26, 1920  8 Sheets-Sheet 3

Inventor—
Roscoe Moore.
by his Attorneys
Howson & Howson

Jan. 4, 1927.

R. MOORE

1,613,474

BRAKE ENGINE

Filed Nov. 26, 1920

Inventor—
Roscoe Moore
by his Attorneys—
Howson & Howson.

Jan. 4, 1927.

R. MOORE

1,613,474

BRAKE ENGINE

Filed Nov. 26, 1920    9 Sheets-Sheet 7

Inventor:-
Roscoe Moore,
by his Attorneys,
Howson & Howson

Patented Jan. 4, 1927.

1,613,474

UNITED STATES PATENT OFFICE.

ROSCOE MOORE, OF WILKES-BARRE, PENNSYLVANIA, ASSIGNOR TO VULCAN IRON WORKS, OF WILKES-BARRE, PENNSYLVANIA, A CORPORATION OF PENNSYLVANIA.

BRAKE ENGINE.

Application filed November 26, 1920. Serial No. 426,430.

My invention relates to brake engines of the weight elevating type, in which the weights are employed to apply the brakes to the moving parts of the mechanism in connection with which the engine may be utilized. The invention has a particular application to hoisting apparatus of the type employed in mines.

One object of my invention is to provide improved automatic means for limiting the upward stroke of the piston in the cylinder, thereby preventing the piston from striking the cylinder head and at the same time preventing the accumulation of excess pressure in the cylinder, with the resultant loss of energy and delay in starting the piston upon the downward stroke.

A further object of the invention is to provide improved automatic means for effecting application of the brake in case of power failure, over-speed or over-travel, the application of the brakes being quick or gentle, according to the needs of the emergency.

A clear conception of the mechanism by means of which the above named and other objects which will appear hereinafter are accomplished will be had from the accompanying drawings, in which.

With reference to the drawings, 1 indicates the base of the engine, and 2 the housing, in the lower portion of which is the power cylinder 3, and in the upper portion a cataract or gag cylinder 4, this latter being required where the actuating fluid is air, but being dispensed with if so desired where oil or other liquid is employed.

Figures 1, 11:
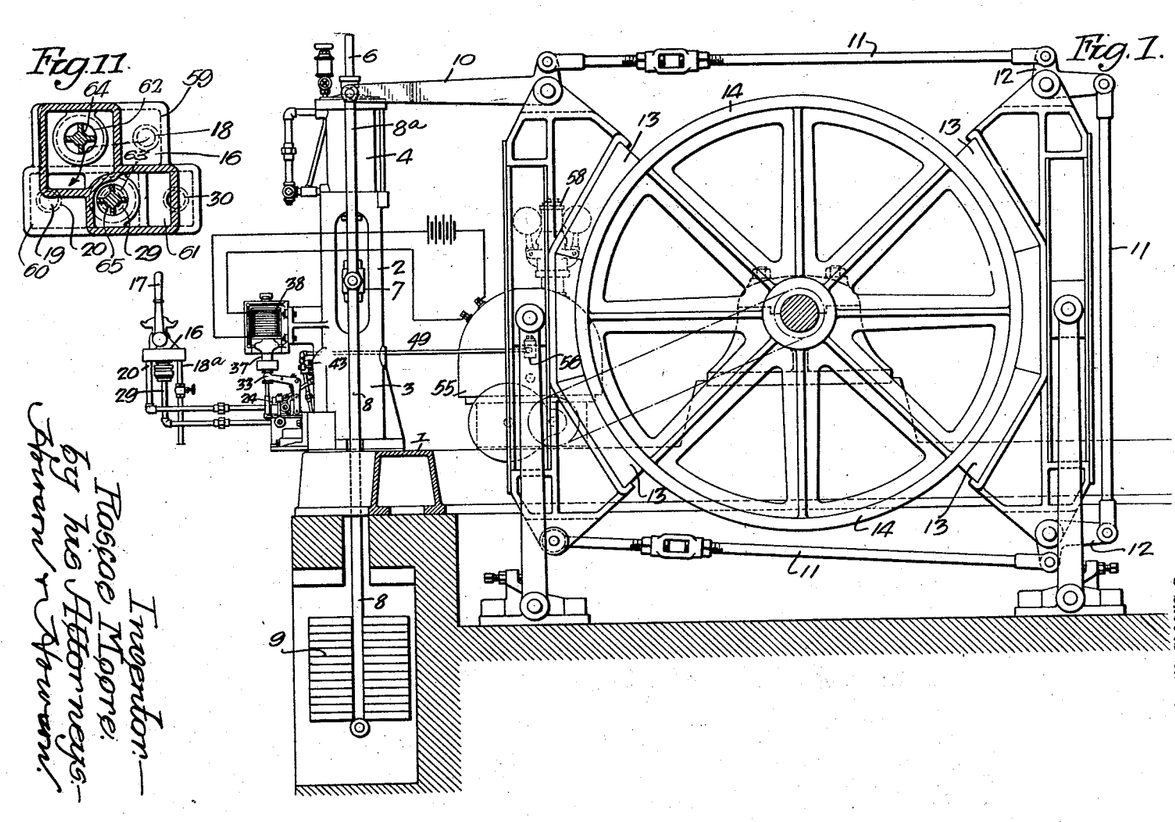
Figure 1 is a side elevation of a brake engine made in accordance with my invention, showing more or less in diagram the drum and brake mechanism of a mine hoist.
Fig. 11 is a horizontal section taken on the line 11—11, Fig. 2.

Adapted to travel within the cylinder 3 is a piston 5, from which extends upwardly a piston rod 6, having the upper end thereof secured to a cross head 7, from which depend weight-supporting rods 8, said rods carrying at their lower ends brake-actuating weights 9. Links 8ª are connected to and extend upwardly above the said cross-head, said links being attached at their upper ends to a yoked brake lever 10, which in the present instance is operably connected by means of reach rods 11 and bell crank levers 12 to brake shoes 13 adapted to operated in connection with the drum 14 of a mine hoist. By admitting an actuating fluid to the cylinder 3 below the piston 5, the latter is forced upwardly, elevating with it the weights 9 and releasing the brake shoes from engagement with the drum, and when later it is desired to apply the brakes, this is accomplished by exhausting the actuating fluid from the cylinder 3, whereupon the piston is carried downwardly by force of gravity acting both upon the piston and upon the weights 9, and the brakes 13 applied.

A single port or duct 15 both admits and exhausts the actuating fluid from the cylinder 3, the flow of the actuating fluid being controlled by means of an operating valve housed in a casing 16. By manipulation of the operating handle 17 of said valve in the directions indicated in Fig. 2, an actuating fluid may be forced through the said duct 15 to release the brakes, or allowed to exhaust therefrom to effect their application to the drum.

Figures 2, 12:
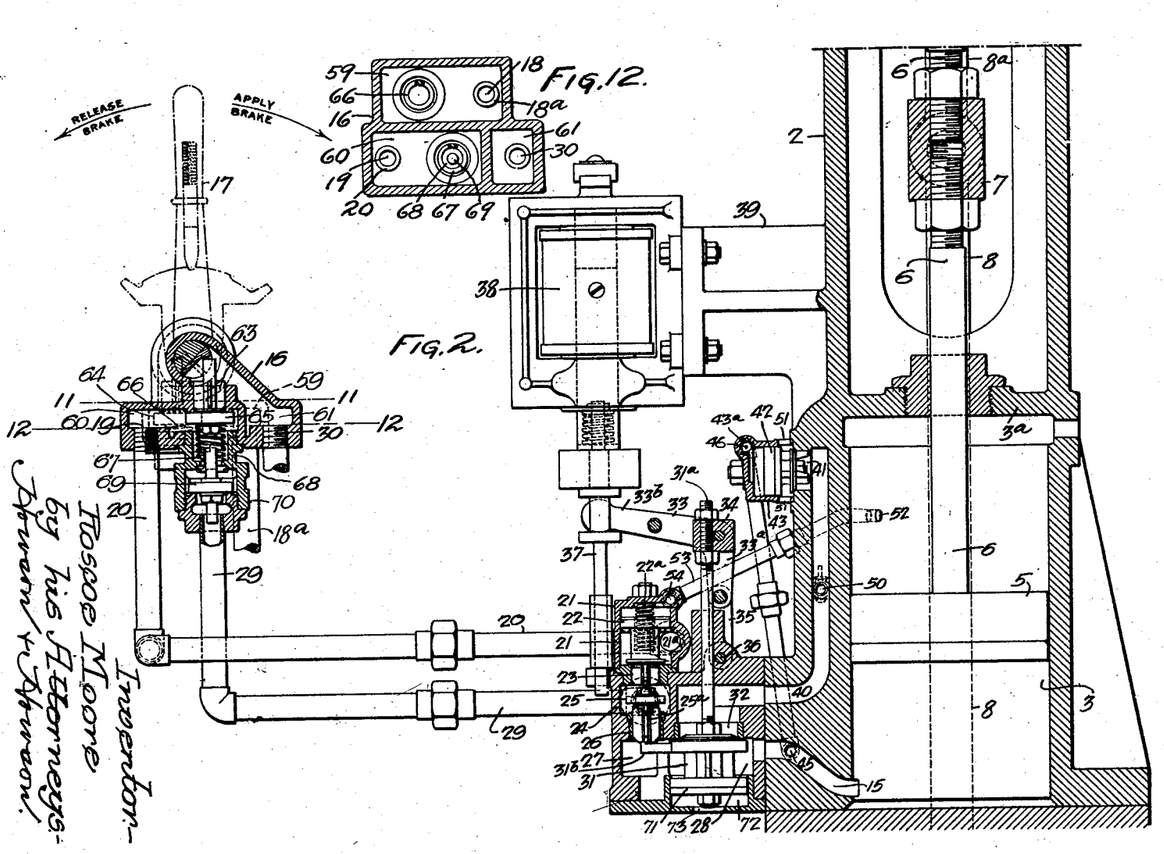
Fig. 2 is a vertical section of a portion of the engine and of the valve mechanism which constitutes the main features of the invention.
Fig. 12 is a horizontal section on the line 12—12, Fig. 2.

The construction of the operating valve in the casing 16 is shown in Figs. 2, 11 and 12. The valve comprises three distinct chambers, 59, 60 and 61, said chamber 59 having a port 62 in the top thereof through which communication is established between chambers 59 and 60, and the said chamber 60 having a port 63 in the top thereof through which communication is established between chambers 60 and 61. Valves 64 and 65 control respectively the ports 62 and 63, said valves normally being elevated to close the ports by means respectively of springs 66 and 67 and being operatively connected with the handle 17 so as to be depressed alternately to open the valves according to the direction in which the said lever is shifted. In the chamber 59 is an air intake port 18 connected by means of suitable piping 18ª to a source of air supply, while an exhaust port 30 is located in the chamber 61. The chamber 60 has therein two ports 19 and 68 from which extend respectively pipes 20 and 29, the port 68 being normally closed by a poppet valve 69 mounted in a suitable valve chamber 70 depending from the valve casing. When the lever 17 is thrown to the "brake-release" position, the valve 64 is depressed and live air admitted from the chamber 59 to the chamber 60. The valves 65 and 69 being closed, the air passes through the pipe line 20 to a valve casing 21, in which is mounted a valve 22, said latter valve being raised from the seat which it normally occupies by the air entering from the pipe 20 through the inlet port 21ª. The elevation of the valve 22 permits the passage of the air through a port 23 into a valve chamber 24, within which is a valve 25, normally held in the elevated position shown in Figs. 2 and 3 by means hereinafter to be described, said valve when open permitting the passage of the air through a port 26 into a lower chamber 27, from whence it passes through a contiguous chamber 28 to the duct 15, and thence to the cylinder 3. When, now, the lever 17 is thrown to the "brake-apply" position, the valve 64 is closed and the valve 65 opened whereby air is permitted to exhaust from the cylinder through the duct 15, through the chambers 28 and 27, and a port 26 into the chamber 24, from which chamber opens a port 24ª into the pipe line 29, returning to the said operating valve 16, the pressure of the air lifting and opening the valve 69, whereby the air is admitted to the chamber 60, from whence it exhausts through the port 63 into the chamber 61 and out through exhaust port 30.

Within the chamber 28 is established a valve 31, which normally is retained in a position closing a port 32 in the top of the said chamber, the valve 31 being normally held in the said port-closing position by means of toggle apparatus comprising a bell crank lever 33 pivotally secured to a block 34 and a link 35 having one end thereof pivotally secured at 36 in the present instance to the valve chamber of the engine, the other end thereof being pivotally attached to the end of the arm 33ª of the said bell crank lever 33.

Figure 3:
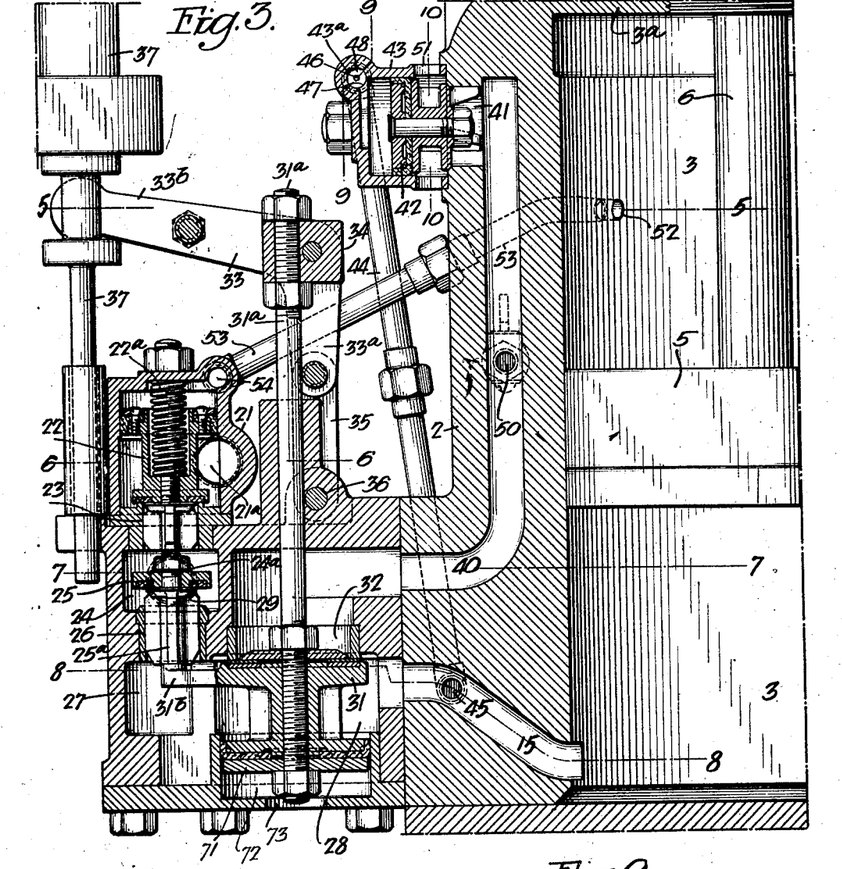
Fig. 3 is an enlarged vertical section of a portion of the engine cylinder and the valve mechanism.
Figure 4:
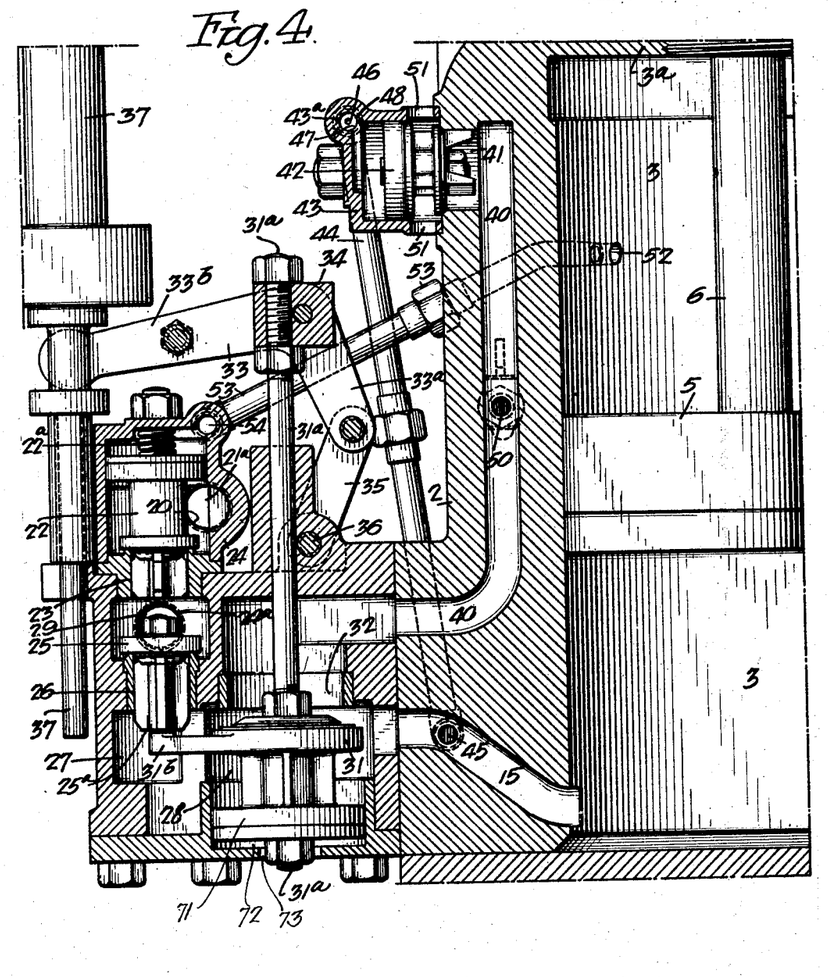
Fig. 4 is a view similar to Fig. 3, showing the valve mechanism in a position assumed when emergency requires setting of the brakes.
Figures 5, 6:
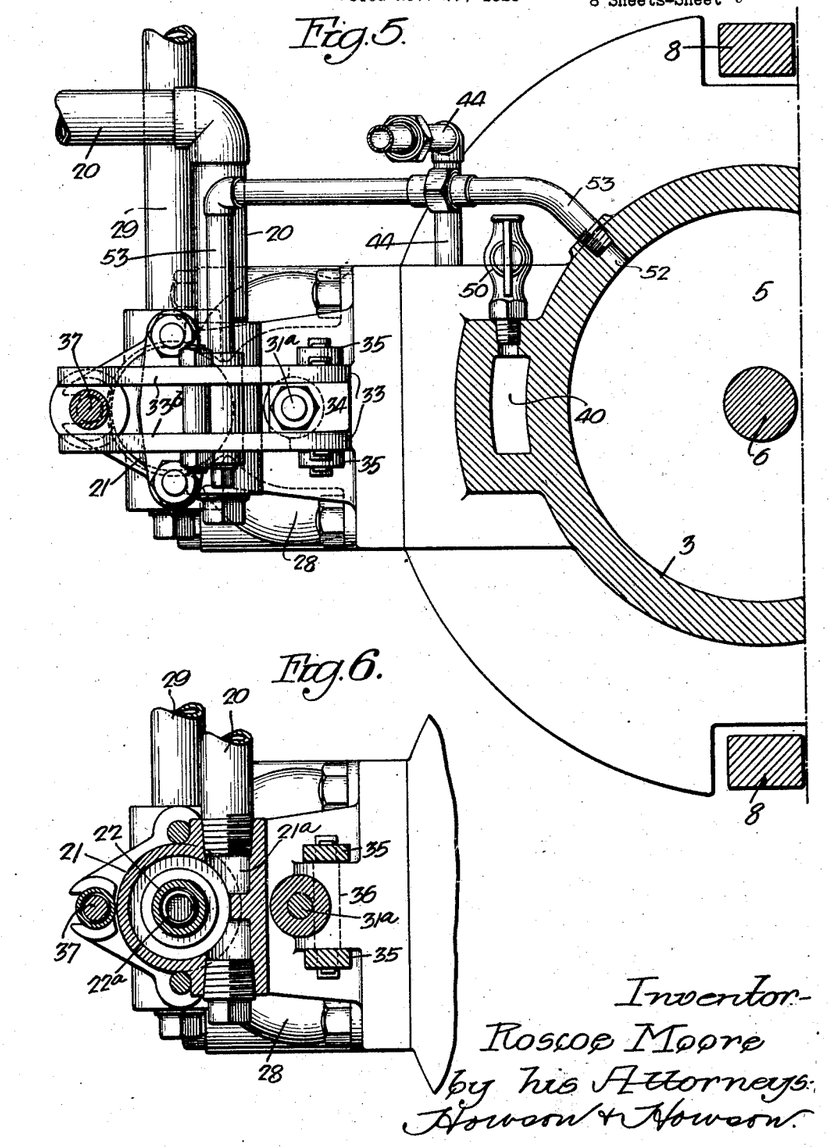
Fig. 5 is a horizontal section on the line 5—5, Fig. 3.
Fig. 6 is a horizontal section taken on the line 6—6, Fig. 3.
Figure 7:
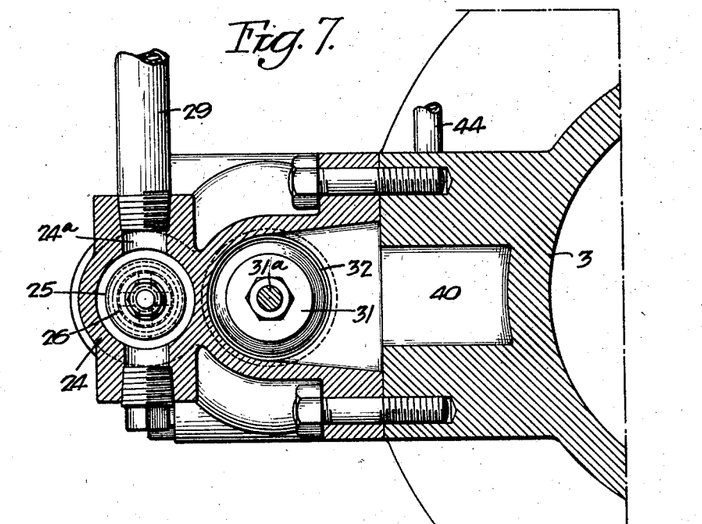
Fig. 7 is a horizontal section taken on the line 7—7, Fig. 3.
Figure 8:
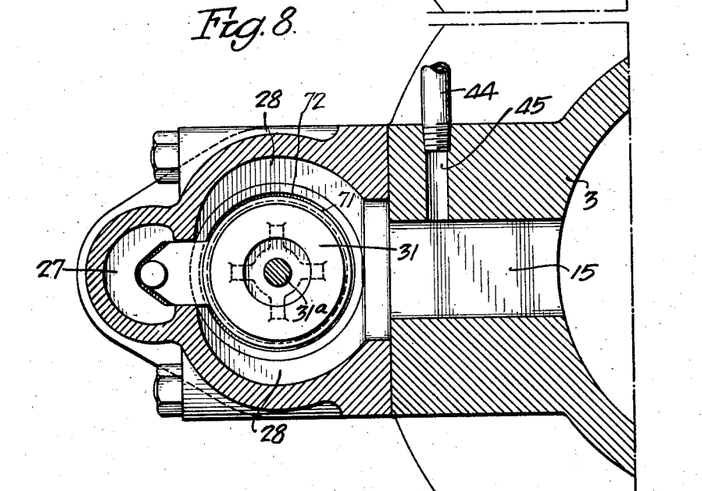
Fig. 8 is a horizontal section taken on the line 8—8, Fig. 3.

Secured within the block 34 is the upwardly extending stem 31ª of the valve 31, the arrangement being such that with the link 35 and the bell crank lever 33 in the relative positions shown in Figs. 2 and 3, the valve 31 is in the elevated position closing the port 32, but when the toggle is broken, as is the case when the arm 33ᵇ of the lever 33 is depressed, the valve 31 is dropped and the port 32 opened, as shown in Fig. 4. The outer end of the arm 33ᵇ of the bell crank lever 33 is operably connected with the stem 37 of a solenoid 38 secured to a suitable bracket 39 extending from the engine frame 2, the normal position of the said stem 37 being such as to hold the arm 33ᵇ in an elevated position, as shown in Figs. 2 and 3, and only when the solenoid becomes deenergized does the stem 37 drop, carrying with it the outer end of the arm 33ᵇ, whereupon the said toggle is broken and the valve 31 dropped, as previously explained.

It will be noted that the valve 31 carries a piston 71 fitted in a cylinder 72, (Fig. 3), the lower face of the piston being exposed to the atmosphere through opening 73, so that when pressure is admitted to the port or chamber 28, there is a tendency for the valve 31 to be pulled into the emergency or open position due to the unequal pressures upon the piston. Means of motive power is thus provided for moving the valves quickly to the emergency position. It will be noted that the piston 71 is of greater area than the port 32 which forms a seat for the valve 31.

The solenoid 38 is of such size as merely to lift the valves 31 and 25 as hereinafter described, when pressure within the chamber 28 has been removed by the setting of the operating valve 16 in the release position. Since the valves are locked by the toggle mechanism, a much smaller solenoid may be used than would otherwise be required to hold the valve against the normal pressure within the chamber 28. It will be seen further that means is thus provided whereby the device (valves) may be reset from the operator's station which may be somewhat removed from the brake engine.

Figure 9:
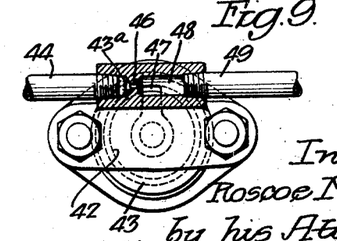
Fig. 9 is a vertical section taken on the line 9—9, Fig. 3.
Figure 10:
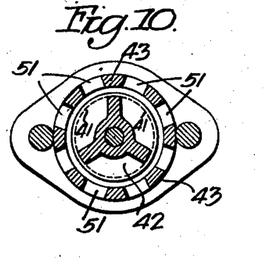
Fig. 10 is a vertical section taken on the line 10—10, Fig. 3.

The port 32, which is controlled by the valve 31, communicates with a passage 40 formed in the present instance in the frame 2 of the engine, said passage 40 communicating at the upper end thereof with a port 41 controlled by a valve device 42. The structure of the valve 42 is most clearly shown in Figs. 3, 9 and 10, said valve comprising a casing 43, within which the valve 42 is established, said casing 43 having a port 43ª, from which extends a pipe 44 which communicates with a port 45 in the side of said passage 15.

The pressure of the actuating fluid within the cylinder 3 normally retains the valve in the closed position illustrated in Fig. 3, said pressure being applied to the outer face of the valve through the ports 45 and 43ª and the pipe 44, the area of the seat in port 41 being somewhat less than the bore of the casing 43 to retain valve 42 in closed position with equal pressures at opposite sides of the valve. The air passing through the port 43ª passes to the interior of the casing 43, through a restricted opening 46 and the port 47, said port 47 also communicating with a port 48 in the casing 43, from which extends a pipe 49 to the limit stop 55 of the hoist, the said pipe 49 normally being closed at the limit stop end by a valve 56 operably connected with the said limit stop in the manner clearly described in U. S. Patent No. 1,509,685, dated September 23, 1924, which discloses a limit stop adapted for use in connection with the engine herein described.

Figure 13:
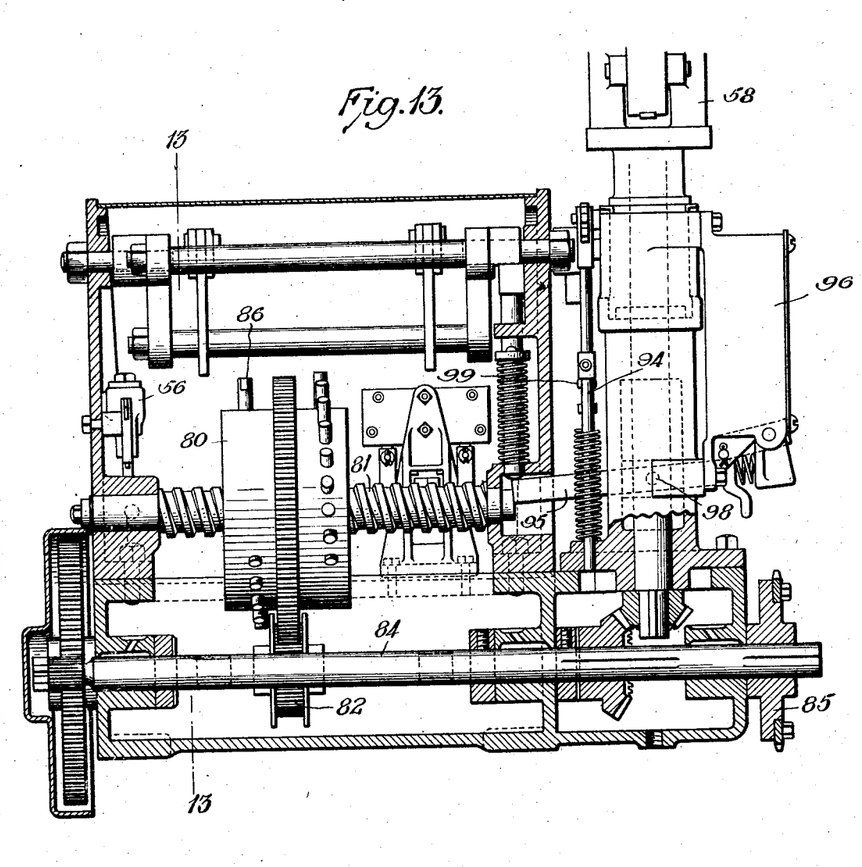
Fig. 13 is a side elevation, partly in section, illustrating details of the limit stop.
Figure 14:
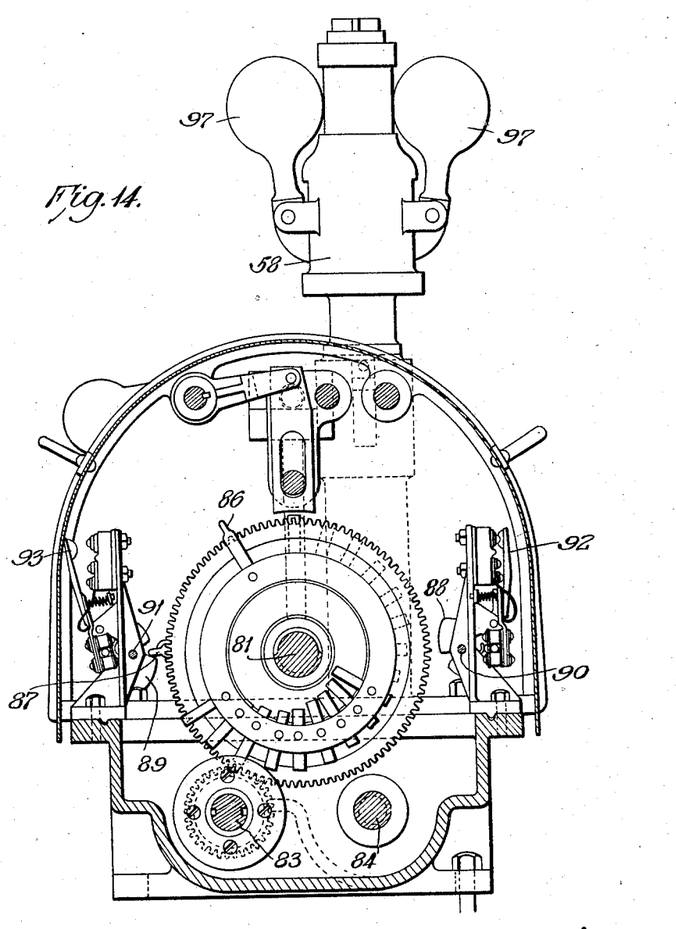
Fig. 14 is a transverse section on the line 14—14, Fig. 13.

This limit stop, illustrated in Figs. 13 and 14, includes a drum 80 mounted on a screw shaft 81 and rotated through a pinion 82 splined to a shaft 83, the latter shaft being rotated by a shaft 84 having a suitable operative connection with the drum shaft of the hoist, see Fig. 1, through a sprocket 85 at one end of said shaft 84. The gearing between the shafts is such that a predetermined movement of the drum 80 along the screw shaft 81 corresponds to the complete travel of the hoist. The drum 80 carries projecting fingers 86 and 87 which are adapted respectively to contact with cams 88 and 89 on two shafts 90, 91, to oscillate the shafts, and these cams are respectively located at opposite limits of travel of the drum on the shaft 81 so that one or other of the shafts is oscillated when the hoist over-travels in either direction. The shafts 90 and 91 are each operatively connected in suitable manner with the valve 56 so that this valve is opened by oscillation, as described, of either shaft. Each of the shafts 90 and 91 is also operatively connected with a switch, 92 and 93 respectively, which may be connected in the circuit of the hoist motor, one or other of the switches being opened simultaneously with the opening of the valve 56.

It will be seen that, the valve 31 being opened as in Fig. 4, the air in the cylinder is permitted to exhaust through the port 32 into the passage 40, thereby creating pressure against the inner face of the valve 42 tending to force the valve outwardly so as to open the port 41. At the same time, however, air is permitted to discharge through the port 45 in the pipe 44, thereby creating a pressure against the outer face of the valve 42 which is approximately equal to the pressure in the pipe 40. However, due to greater area of piston 42, the valve remains in closed position. At the same time, the air in the passage 40 is permitted to discharge to the atmosphere through a cock 50 stationed in the present instance in the side of the said passage. It will be seen that the pressure in the pipe 44 which is exerted against the outer face of the valve is somewhat greater than the pressure in the passage 40, which is reduced by the escape of air through the cock 50, assisting the valve to be maintained in its closed position whenever air is discharged through port 40. When, however, the valve 56 at the limit stop is operated, which occurs when the hoist has over-traveled, the air which passes into the valve casing 43 through the pipe 44 is permitted to discharge from the said casing through the pipe 49 at a faster rate than it enters, due to the restricted opening 46 through which it must pass before entering the said casing, whereby the pressure of the air against the outer face of the valve falls below that in the passage 40, and the valve 42 is accordingly forced outwardly, thereby permitting the air to rush from the cylinder 3 through the various connecting passages and the port 41, and through the apertures 51 in the side of the casing, which apertures normally are closed by the said valve. The piston is thus allowed to fall quickly to the bottom of the cylinder and the weights permitted to set the brake shoes 13 against the drum.

As clearly described in my aforementioned Patent No. 1,509,685, the solenoid 38 is electrically interconnected with the limit stop 55 and with the speed governor 58 of the hoist in such a manner that in case of over-speeding of the hoist due to power failure or for other reason, the magnet is de-energized, the core 37 as it drops breaking the toggle device which normally supports the valve 31 and permits the latter to drop. In this case, the air in the cylinder is exhausted through the cock 50 and the application of the brakes is correspondingly slow. The speed governor 58 of the hoist is operated through the shaft 84 and, through suitable linkage including a rod 94 and lever 95, is operatively connected with a switch 96 connected with the solenoid 38. When the speed of the hoist becomes excessive, the governor balls 97, 97, move out and down and force downward the rod 94. The latter carries a dog 99 which engages the lever 95 and moves this lever about the pivot 98 which opens the switch 96, thereby deenergizing the solenoid.

Extending laterally from the valve 31 is an arm 31$^b$ which, when the valve 31 is closed, as shown in Fig. 2, engages the valve stem 25$^a$ of the valve 24 and elevates the latter off its seat whereby the port 26 is opened. When now the valve 31 is depressed to open the port 32, the valve 25 is permitted to drop, closing the port 26 and thereby shutting off the supply of live air to the under side of the piston 5, the air under the piston of necessity discharging from the passage 40 and through either the cock 50 or the valve 42, as the case may be. Under normal conditions, however, as previously stated, the discharge of the air from the cylinder takes place through the port 15, the pipe 29 and the operating valve 16.

In the side of the cylinder 3 at a point in the upper end thereof is a port 52, from which port a pipe 53 extends to a port 54 in the valve casing 21, said port 54 being located above the valve 22. As the air enters the cylinder 3 through the pipe 20, the valve 22 is elevated in the manner previously described. Should now the piston 5 move upwardly in the cylinder to a point clearing the port 52, it will be apparent that live air will pass through the pipe 53 into the valve casing 21, whereupon the pressure of the air on the opposite sides of the valve is equalized. Under these conditions the weight of the valve together with the pressure of the spring 22$^a$ is sufficient to return the said valve 22 to the port-closing position whereby further admission of air to the cylinder 3 is cut off in spite of the fact that the operating lever 17 is in the operating position. In this manner, the upward stroke of the piston in the cylinder is limited and the piston prevented from striking the cylinder head 3$^a$ with a consequent development of undue excess of pressure in the cylinder preventing rapid return of the piston to the bottom of the cylinder if quick application of the brake is required.

I claim:

1. In an engine, the combination with a cylinder having a piston therein, of means for admitting an actuating fluid to the cylinder, normal exhaust means for the fluid, auxiliary exhaust means, and mechanism automatically operative under predetermined conditions for shutting off the admission of the actuating fluid and for bringing the auxiliary exhaust means into operation.

2. In an engine, the combination with a cylinder having a piston therein, of means for admitting and exhausting an actuating fluid to and from the cylinder, a valve controlling the admission and exhaust, auxiliary exhaust means, a second valve controlling said auxiliary exhaust means, and mechanism automatically operative under predetermined conditions for simultaneously operating the first valve to shut off the admission and normal exhaust and for operating the second valve to bring the auxiliary exhaust means into operation.

3. The combination with an engine having means for the admission and exhaust of an actuating fluid, auxiliary exhausting means for said fluid, a valve controlling said auxiliary exhausting means, a traveling drum, brakes for the drum operated by said engine, and mechanism controlled by the movement of said drum for actuating said auxiliary exhaust valve.

4. The combination with an engine having means for the admission and exhaust of an actuating fluid, auxiliary exhausting means for said fluid, a valve controlling said auxiliary exhausting means, a traveling drum, brakes for the drum operated by said engine, mechanism controlled by the movement of said drum for actuating said auxiliary exhaust valve, and means whereby when the latter is opened the said normal exhausting means is rendered inoperable.

5. The combination with a traveling drum, of brakes for said drum, and an engine for operating said brakes, said engine comprising means for the admission and normal exhaust of an actuating fluid, auxiliary means providing for slow exhaust, auxiliary means providing for rapid exhaust, and mechanism controlled by the movement of said drum for bringing the said auxiliary exhaust means into operation.

6. The combination with a traveling drum, of brakes for said drum, and an engine for operating said brakes, said engine comprising means for the admission and normal exhaust of an actuating fluid, auxiliary means providing for slow exhaust, auxiliary means providing for rapid exhaust, mechanism controlled by the movement of said drum for bringing the said auxiliary exhaust means into operation, and means whereby operation of said auxiliary exhaust means renders the normal exhaust inoperative.

7. The combination with a traveling drum, of brakes for said drum, and an engine for operating said brakes, said engine comprising a cylinder having a piston therein, means for admitting and exhausting an actuating fluid to and from the cylinder, an operating member normally controlling the said admission and exhaust, an auxiliary exhaust duct having an opening therein providing for slow exhaust, and an opening therein providing for rapid exhaust, a valve controlling said latter opening, a valve in said duct, mechanism controlled by the movement of said drum for actuating said valves, and means whereby the actuation of said duct valve renders the normal exhaust means inoperative.

8. In an engine, the combination with a cylinder having a piston therein, of means for admitting an actuating fluid to one end of the cylinder, two independent means for exhausting the actuating fluid from the cylinder, a valve controlling one of said exhaust means, means whereby pressure of the fluid in the said cylinder end is utilized to retain the valve normally closed, and means for reducing the retaining pressure below the pressure in the cylinder and for thereby opening the valve.

9. In an engine, the combination with a cylinder having a piston therein and normal admission and exhaust means for an actuating fluid, of an auxiliary exhaust port for said fluid, a valve controlling said port and adapted to be opened by pressure of the fluid within the cylinder, a casing in which said valve operates, said casing having a restricted port for the admission of fluid from the cylinder whereby the valve is normally retained in closed position, an enlarged exhaust port adapted when open to reduce the pressure in the casing below that in the cylinder, and a valve controlling said enlarged port.

10. The combination with a traveling drum, of brakes for said drum, and an engine for operating said brakes comprising a cylinder having a piston therein and normal admission and exhaust means for an actuating fluid, an auxiliary exhaust port for said fluid, a valve controlling said port and adapted to be opened by pressure of the fluid within the cylinder, a casing in which said valve operates, said casing having a port for the admission of fluid from the cylinder whereby the valve is normally retained in closed position, and means actuated by the movement of the drum whereby the fluid is exhausted from the casing faster than it is admitted whereby the pressure in the casing falls below that in the cylinder.

11. In an engine, the combination with a cylinder having a piston therein, of means for admitting an actuating fluid to the cylinder, normal exhaust means for said fluid, an auxiliary exhaust providing for slow exhaust of the actuating fluid, and speed responsive apparatus normally disconnecting said auxiliary exhaust means and operative under predetermined conditions to connect the auxiliary exhaust means with the cylinder.

ROSCOE MOORE.